United States Patent [19]

Ichii et al.

[11] Patent Number: 5,472,127
[45] Date of Patent: Dec. 5, 1995

[54] STRIP TENSION CONTROL APPARATUS

[75] Inventors: Yasuo Ichii; Saburo Ikeda; Toshihiko Chino, all of Chiba, Japan

[73] Assignee: Kawasaki Steel Corporation, Kobe, Japan

[21] Appl. No.: 321,573

[22] Filed: Oct. 11, 1994

Related U.S. Application Data

[63] Continuation of Ser. No. 918,225, Jul. 21, 1992, abandoned.

[51] Int. Cl.$^6$ .......................... B23Q 16/00; G11B 15/56; B65H 59/38
[52] U.S. Cl. .......................... 226/44; 226/118; 242/413.9; 242/414.1; 318/6
[58] Field of Search .......................... 226/25, 44, 118, 226/195; 242/75, 75.3, 75.43, 75.44, 414.1, 413.9; 318/6, 7

[56] References Cited

U.S. PATENT DOCUMENTS

| | | | |
|---|---|---|---|
| 2,325,381 | 7/1943 | Edwards et al. | 242/413.9 |
| 4,004,510 | 1/1977 | Roch | 226/25 X |
| 4,033,492 | 7/1977 | Imai | 226/44 X |
| 4,280,081 | 7/1981 | Dinger et al. | 242/414.1 |
| 4,307,591 | 12/1981 | Peterson | 226/25 X |
| 4,359,178 | 11/1982 | Hayashi et al. | 226/25 |
| 5,083,693 | 1/1992 | Pohl | 226/44 |
| 5,119,982 | 6/1992 | Hutzenlaub | 226/44 |
| 5,125,592 | 6/1992 | Sato | 318/7 X |

FOREIGN PATENT DOCUMENTS 882447  5/1953  Germany .................................. 318/7

*Primary Examiner*—Daniel P. Stodola
*Assistant Examiner*—Michael R. Mansen
*Attorney, Agent, or Firm*—Dvorak and Traub

[57] ABSTRACT

The tension of a strip can be controlled with high responsiveness and high accuracy despite its drastic external variation by threading the strip (1) between a transportation roll (2) and a movable transportation roll (10) and moving the movable transportation roll (10). The movable transportation roll (10) is mounted on one end of an arm (11), which is mounted for a swing motion around a supporting shaft (12), a torque around the supporting shaft (12) is generated in the arm (11) by an arm driving motor (14) connected directly to the supporting shaft (12), thereby applying a tension to the strip (1). The angle of swing motion of the arm (11) is detected by an arm angle sensor (16), and the tension of the strip (1) is detected by a tension sensor (15). The torque to be generated in the arm (11) is corrected in accordance with the detected angle and tension, whereby the strip tension is controlled for a target tension.

4 Claims, 4 Drawing Sheets

PRIOR ART

STRIP TENSION CONTROL APPARATUS

This application is a continuation of application Ser. No. 07/918,225, filed Jul. 21, 19982, now abandoned.

BACKGROUND OF THE INVENTION

1. Field of the Invention

The present invention relates to a strip tension control apparatus for controlling the tension of a strip by threading the strip between a transportation roll and a movable-transportation roll and moving the movable transportation roll. The apparatus is adapted for maintaining a given strip tension in a process line for rolling or the like.

2. Description of the Related Art

In order to secure reliable quality of a strip in a process line for metal or nonmetal rolling or the like, it is necessary, in general, to perform a continuous operation in the central section of the line while transporting the strip at a fixed speed and applying a tension to the strip.

In the supply- or delivery-side section of the process line, limited-length strips are wound off or up in the form of coils. At breaks in the coil jointing or at the time of recoiler change, each strip is accelerated, decelerated or stopped supply- or delivery-side section.

In order to secure continuous operation in the central section despite such transitory acceleration, deceleration or stopping in the supply- or delivery-side section, the process line is provided with a looper.

When the looper operates as the strips are decelerated, stopped, or accelerated in the supply- or delivery-side section, however, a variation in tension may be transmitted from the supply- or delivery-side section to the strips in the continuously running central section. This transmission of the variation in tension adversely effects the quality of the strip in the central section and causes the strips to meander, thus possibly breaking the strips.

To cope with this, a tension control apparatus has been proposed in Japanese Patent Laid-Open No. 1-308347. The prior art apparatus includes a dancer roll disposed in the central section, whereby the transmission of the variation in tension is deterred to apply a fixed tension to the strips.

The prior art tension control apparatus having the dancer roll is constructed in the manner shown in FIG. 4. In FIG. 4, a strip 1 is passed from one transportation roll 2 to the other transportation roll 2 via a dancer roll 3. The dancer roll 3 is linked to a wind-up drum 4 and a counterweight 6 by means of a wire 5, and the drum 4 is connected to a motor 8 through a speed reducer 7. The motor 8 causes the speed reducer 7 to rotate the wind-up drum 4, thereby moving the dancer roll 3 up and down. The tension of the strip 1 is controlled by regulating the torque of the motor. Guide means 9 is used to fix the direction of action of the dancer roll 3.

However, the conventional prior art tension control apparatus having the dancer roll is helpless against a drastic external variation in tension of the strip in the central section. In operation, high mechanical resistances are produced between the dancer roll 3 and the guide means 9 and between the wind-up drum 4 and the wire 5.

The dancer roll 3 is subject to a high moment of inertia during the operation caused by the action of the wind-up roll 4, the motor means 8, and the speed reducer 7, as shown in FIG. 4.

A backlash of the speed reducer results in a delay in operation or a new variation in tension attributable to the action of the dancer roll.

Furthermore, the conventional tension control apparatus having the dancer roll is quite helpless against a fine variation in tension due to its great structural mechanical loss, backlash in its mechanical system, and high mechanical resistance. Thus, the prior art does not permit high-accuracy tension control in response to variations in tension in a continuous operation of the type described above.

Modern steel sheets for use in automobiles and the like are expected to respond quickly to a fine variation in tension, since they are made of very-low-carbon steel, have a small sectional area, and are transported at a super-high speed, as high as 1,000 m/min, as they are processed. There is, therefore, a demonstrated need for advancement in the art of continuous operation strip tension control.

OBJECTS AND SUMMARY OF THE INVENTION

The present invention has been contrived to solve the problems not addressed by the prior art. A first object of the invention is to provide a strip tension control apparatus capable of controlling the tension of a strip with high responsiveness and high accuracy despite its drastic external variation.

A second object of the present invention is to provide a strip tension control apparatus capable of controlling the tension of a strip with good responsiveness and satisfactory accuracy by means of a small-capacity motor, despite a fine variation in the strip tension.

According to the present invention, there is provided an apparatus for controlling the tension of a strip by threading the strip between a transportation roll and a movable transportation roll and moving the movable transportation roll.

A strip tension control apparatus according to the present invention comprises a supporting shaft, rotatably supported by bearing means, and an arm mounted for a swing motion around the supporting shaft and having one end connected to a movable transportation roll. A torque around the supporting shaft is generated in the arm by connecting an arm driving motor directly to the supporting shaft, so that a tension is applied to the strip. The angle of swing motion of the arm is detected by means of an angle sensor, the tension of the strip is detected by means of a tension sensor, and the torque generated in the arm is corrected in accordance with the detected angle and the detected tension, whereby the tension of the strip is controlled for a target tension.

The torque of the arm is thus controlled by means of the arm driving motor, and the tension control is effected by turning the movable transportation roll through the medium of the arm. In contrast with the case of the conventional prior art dancer roll, neither the wind-up drum nor the wire is required, so that the mechanical resistance in the present invention is very small. Moreover, the absence of the wind-up drum and the like in the present invention minimizes the moment of inertia of the machine axis system. Furthermore, since the arm driving motor is connected directly to the supporting shaft there is no possibility of undergoing a delay in operation or a new variation in tension, which may be caused by backlash when a speed reducer is used.

Despite its drastic variation externally introduced into the central section of a process line or the like, the tension of the strip can be controlled with high responsiveness and high accuracy. Thus, very effective tension control which is beyond the capability of the conventional prior art dancer roll can be enjoyed.

According to the present invention, the torque is generated in the arm by the following method, as well as by connecting the arm driving motor directly to the supporting shaft.

The supporting shaft is provided with a counterweight which is adjustable in position with respect to a direction perpendicular to the supporting shaft, and the torque around the supporting shaft is generated in the arm by means of the counterweight. The torque to be generated in the arm can be controlled through the control of the motor torque and the adjustment of the counterweight position.

The angle of swing motion of the arm is detected by means of the angle sensor, and the tension of the strip is detected by means of the tension sensor. Based on the detected angle and the detected tension, the output of the arm driving motor and the position of the counterweight are controlled to control the torque to be generated in the arm, whereby the tension of the strip is controlled at the target tension.

Accordingly, the torque control by means of the arm driving motor and the torque control through the counterweight position control can be effected in combination with each other.

Thus, the tension of the strip can be controlled with good responsiveness and satisfactory accuracy. In consequence, very effective tension control which is beyond the capability of the conventional prior art dancer roll can be enjoyed such that a fine variation of the strip tension can be eliminated with high accuracy.

Since the torque control by means of the arm driving motor and the torque control through the counterweight position control is effected in combination with each other, the torque required of the motor can be reduced.

For example, an arm torque to be somewhat fixedly applied depending on the target tension can be obtained through the adjustment of the counterweight position, while an arm torque which rises quickly in response to the variation in tension can be obtained through the torque control by means of the arm driving motor. Accordingly, the motor must only bear the torque corresponding to the variation in tension, so that the motor requires only a small capacity.

Thus, the arm driving motor and a drive unit may be kept to a minimum resulting in an economical advantage. For the initialization of a torque which makes up for the torque of the motor, moreover, reasonable tension control can be ensured such that the torque control is effected through the counterweight position control and the motor can be used for dynamic torque control. In consequence, high-accuracy tension control can be enjoyed.

DETAILED DESCRIPTION OF THE PREFERRED EMBODIMENTS

Preferred embodiments of the present invention will now be described in detail with reference to the drawings.

Figure 1:
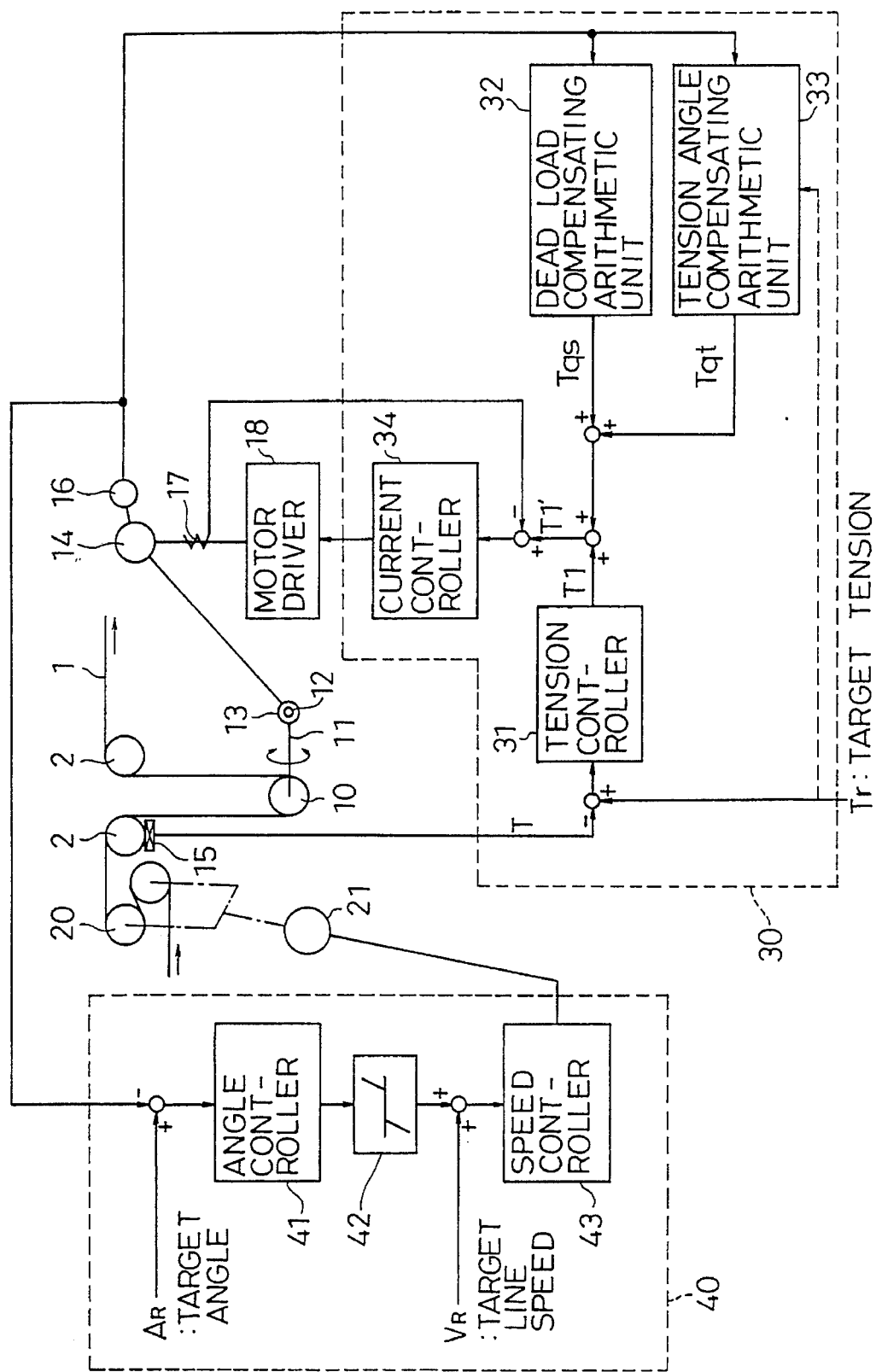
FIG. 1 is a block diagram showing an outline of a first embodiment of the present invention, with parts in a layout diagram.

A first embodiment of the present invention is a strip tension control apparatus constructed in the manner shown in FIG. 1.

In the strip tension control apparatus of the present invention, as shown in FIG. 1, a strip 1 is threaded between transportation rolls 2 and a movable transportation roll 10. The apparatus generally comprises a movable transportation roll 10, an arm 11, the supporting shaft 12, an arm driving motor 14, a tension sensor 15, an arm angle sensor 16, a tension control section 30, bridle rolls 20, a bridle roll driving motor 21, and a strip speed control section 40. The tension of the strip 1 is controlled through a pivoting movement of the roll 10 about the shaft 12.

The arm 11, one end of which is supported by the supporting shaft 12, is adapted to swing around the shaft 12, and the movable transportation roll 10 is connected to the other end. The supporting shaft 12 is pivotally supported by bearing means 13. Both axial ends of the roll 10 are supported by the arm 11.

The arm driving motor 14, which is coaxially connected to the supporting shaft 12, is used to generate a torque around the supporting shaft 12, thereby applying a tension to the strip 1.

The arm angle sensor 16 is used to detect the angle of swing motion of the arm 11 or the rotational angle of the arm driving motor 14. A detected angle θ is entered in the tension control section 30 and the strip speed control section 40.

The tension sensor 15, which detects the tension of the strip 1, is located very close to the transportation rolls 2. The tension control section 30 includes a tension controller 31, a dead load compensating arithmetic unit 32, and a tension angle compensating arithmetic unit 33. The tension controller 31 feeds back and comparatively calculates the detected tension T from the tension sensor 15 with respect to the target tension Tr, and delivers the torque control command T1. The dead load compensating arithmetic unit 32 is used to compensate the torque for the dead load of the movable transportation roll 10 and the arm 11 in accordance with the detected angle θ from the angle sensor 16. The tension angle compensating arithmetic unit 33 is used to compensate (output torque compensation) a change of the relationship between the strip tension and the output torque of the arm driving motor 14 in accordance with the angle of the arm 11.

The torque control command T1 is compensated by the respective outputs of the arithmetic units 32 and 33 to become a compensatory torque command T1', which is entered in a current controller 34.

A current sensor 17 is provided for detecting the current of the motor 14 and feeding it back to the compensatory torque command T1'. The torque command T1' or current command fed back in this manner is entered in the current controller 34. The current controller 34 is used to enter a command for controlling the input current (torque) of the motor 14 in a motor driver 18 in response to the input current command.

As an example, the dead load compensating arithmetic unit 32 may carry out dead load compensation in the following. If the dead load of the movable transportation roll 10, the arm 11, the distance between its center of gravity and a supporting point, and the angle of displacement of the arm 11 from its horizontal position (at angle of 0°) are W, Lo, and θ, respectively, a torque compensation value Tqs for the dead load is given by $$Tqs = W \cdot Lo \cdot \cos\theta \qquad (1)$$

The torque for the dead load is compensated by adding the torque compensation value Tqs to the torque control command T1.

As an example, the tension angle compensating arithmetic unit 33 may carry out output torque compensation in the following manner.

If the strip tension and the distance between the arm 11 and the supporting shaft 12 are To and Lr, respectively, an output torque compensation value Tqt for the compensation of the output torque based on the angle θ is given by $$Tqt = 2To \cdot Lr \cdot \cos\theta \qquad (2)$$

The output torque is compensated by adding the output torque compensation value Tqt to the tension command.

The strip speed control section 40 controls the transportation speed of the strip 1 so that it is adjusted to a target speed Vr, and controls the angle θ of the arm 11 for a target angle Ar.

The speed control section 40 includes an angle controller 41, a dead band generator 42, and a speed controller 43. The angle controller 41 compares the target angle Ar and the detected angle θ, and delivers speed modification commands for correcting the angle of the arm 11. The dead band generator 42 supplies the speed controller 43 with a speed modification command, among others, of which a fine transient variation of angle is cut off. The speed controller 43 controls the speed of the bridle roll driving motor 21, and hence, the rotational speed of the bridle rolls 20 in response to the corrected speed modification command thereby adjusting the transportation speed of the strip so that the angle of the arm is fixed.

The dead band generator 42 serves to remove a fine transient variation of angle in a speed modification signal for angle correction, since any transient signal variation is harmful.

The following is a description of the operation of the apparatus of the first embodiment. In the tension control apparatus shown in FIG. 1, the strip 1 is windingly fed through the bridle rolls 20, threaded between the one transportation roll 2, the movable transportation roll 10, the other transportation roll 2, and then delivered to a subsequent stage of flow. During this process, the tension sensor 15 detects the tension T of the strip 1, and the angle sensor 16 detects the angle θ of the arm 11 fitted with the roll 10, to its horizontal position. The detected tension T and the detected angle θ are entered in the tension control section 30, and at the same time the target tension Tr is set in the control section 30. The detected tension T is fed back to the target tension Tr, whereupon the torque control command T1 is obtained.

Meanwhile, the detected angle θ is entered in the dead load compensating arithmetic unit 32 and the tension angle compensating arithmetic unit 33, whereupon the units 32 and 33 calculate the torque compensation value Tqs for the dead load and the output torque compensation value Tqt of the tension according to equations (1) and (2). These compensation values are added to the torque control command T1 so that the command T1 is compensated to become the compensatory torque command T1'.

The compensatory torque command T1' is entered as a torque command value, that is, a current command value, in the current controller 34. In response to this compensatory torque command T1', the current controller 34 controls the motor driver 18 thereby regulating the toque of the arm driving motor 14, and hence, the tension of the strip 1. In this case, the motor current detected by means of the current sensor 17 is fed back to the compensatory torque command T1', and entered in the current controller 34. In response to this compensatory torque command T1', the current controller 34 controls the current supply from the motor driver 18 to the arm driving motor 14, thereby regulating the motor current so that the torque of the motor 14 is adjusted to the command value T1'.

In order to correct the angle by comparing the angle θ with the predetermined target angle Ar, the angle controller 41 delivers the speed modification command for the line speed Vr. In this case, the fine transient angle variation is removed by means of the dead band generator 42 to prevent a hindrance.

Thereafter, the speed correction signal is added to the target line speed Vr and is entered as a speed command in the speed controller 43. In response to the input speed command, the speed controller 43 controls the bridle roll driving motor 21, thereby adjusting the transportation speed of the strip and the angle θ of the arm 11 to the target speed Vr and the target angle Ar, respectively.

Table 1 shows results of comparison between the strip tension control apparatus of the present embodiment and the conventional prior art tension control apparatus using the dancer roll.

TABLE 1

| No. | Items | Prior Art | First Embodiment | Remarks |
|---|---|---|---|---|
| 1 | GD² (Machine axis) | Great | Small | Approx. ½ of prior art |
| 2 | Mechanical loss | Great | Small | Prior art level: about 50 kg*¹ Embodiment: about 2 kg*² |
| 3 | Backlash | Some | None | Due to direct connection of motor |

*¹In strip tension equivalent
*²Frictional torque of bearing means only

In this case, compared factors include moment of inertia $GD^2$, mechanical loss, and backlash. The moment of inertia of the apparatus of the present embodiment is about half that of the conventional apparatus. The mechanical loss of the apparatus of the first embodiment is about 2 kg in terms of strip tension, as compared with about 50 kg for the conventional apparatus. This is because the apparatus of the present embodiment involves only the frictional torque of the bearing means of the supporting shaft whereas the conventional apparatus is subject to a mechanical loss of the up-and-down motion mechanism for the dancer roll. Although the conventional apparatus is subject to backlash, the apparatus of the first embodiment is not. This is because the motor is connected directly to the arm supporting shaft.

A second embodiment of the present invention will now be described.

Figure 3:
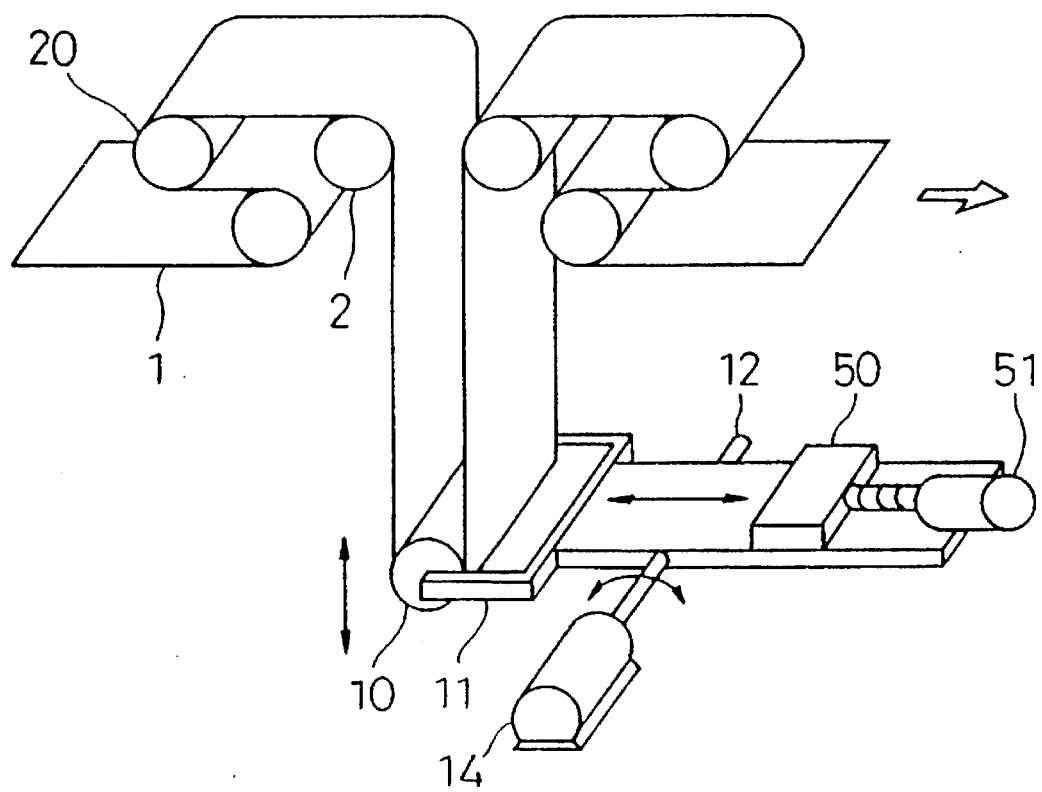
FIG. 3 is a perspective view illustrating the principal part of the present invention shown in FIG. 2.
Figure 4:
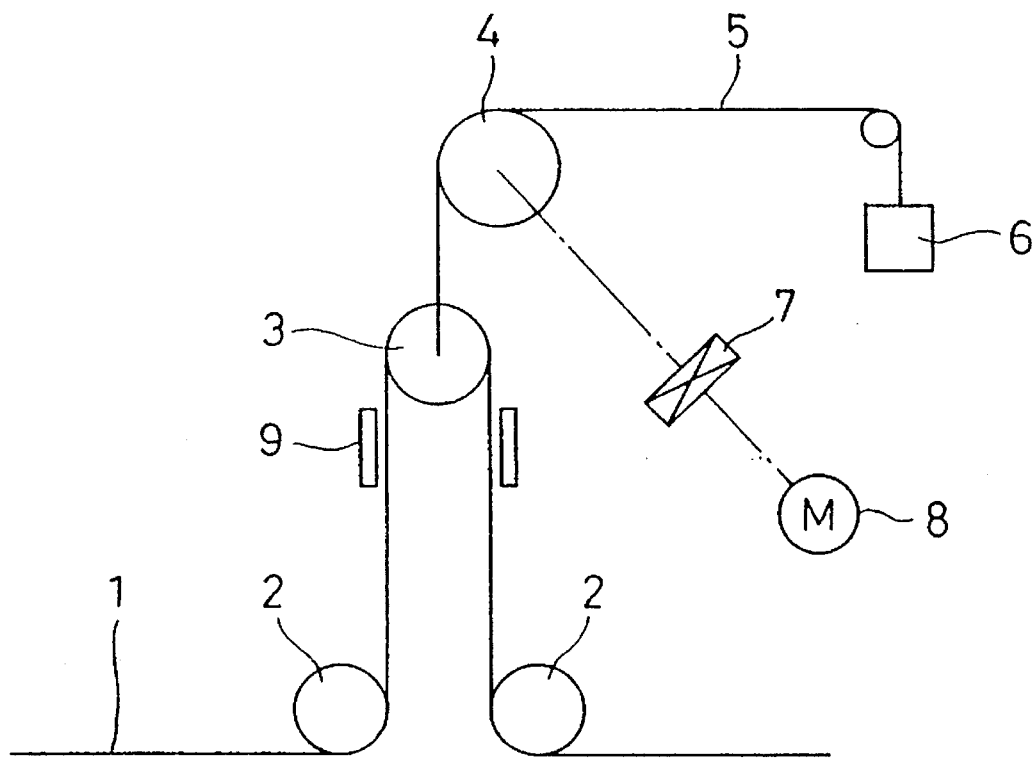
FIG. 4 is a layout diagram showing an arrangement of a conventional prior art tension control apparatus using a dancer roll.

The second embodiment is a strip tension control apparatus constructed in the manner shown in FIG. 3. As shown in FIG. 3, this strip tension control apparatus, which is constructed substantially in the same manner as the apparatus of the first embodiment, further comprises a counterweight 50, a counterweight position shifting motor 51, and a counterweight position sensor 52.

The counterweight 50 is arranged on an arm 11 for movement in the longitudinal direction of the arm (or at right angles to a supporting shaft 12). A torque generated in the arm 11 is controlled by adjusting the longitudinal position of the counterweight 50. The counterweight 50 is moved by driving the counterweight shifting motor 51. The position of the counterweight 50 is detected by means of the counterweight position sensor 52, and is entered in a tension control section 30 (dead load compensating arithmetic unit 32 in the section 30).

More specifically, the tension control section 30 includes a tension controller 31, the dead load compensating arithmetic unit 32, a tension angle compensating arithmetic unit 33, and a counterweight position setter 54. The tension controller 31 feeds back and comparatively calculates a detected tension T with respect to a target tension Tr, and delivers a torque control command T1. The dead load compensating arithmetic unit 32 is used to compensate the moment of inertia for the dead load of a movable transportation roll 10 and the arm 11 in accordance with a detected angle θ from an angle sensor 16. The tension angle compensating arithmetic unit 33 is used to compensate (output torque compensation) a change of the relationship between the strip tension and the output torque of an arm driving motor 14 in accordance with the angle of the arm 11. The counterweight position setter 54 is used to set the position of the counterweight 50 in accordance with the target tension Tr.

In response to the set target tension Tr, the counterweight position setter 54 calculates the position St of the counterweight 50 and applies a signal indicative of this position St to a counterweight drive section 53. The calculation of the counterweight position St will be described in detail later.

In response to the input position signal, the counterweight drive section 53 drives the counterweight position shifting motor 51 to move the counterweight 50 so that the counterweight 50 is located in the position set by means of the setter 54.

The speed control section 40 includes an angle controller 41 and a speed controller 43. The angle controller 41 compares a target angle Ar and the detected angle θ, and delivers a speed modification command for correcting the angle of the arm 11. The speed controller 43 controls the speed of the bridle roll driving motor 21, and hence, the rotational speed of the bridle rolls 20 in response to the delivered speed modification command thereby adjusting the transportation speed of the strip so that the angle of the arm is fixed.

For other parts, the second embodiment is arranged in the same manner as the first embodiment, so that like reference numerals are used to designate the same parts throughout the drawings.

The following is a description of some processes of operation which differentiate the second embodiment from the first embodiment. The target tension Tr is entered in the counterweight position setter 54, whereupon the setter 54 calculates the position St of the counterweight 50 in accordance with the input target tension Tr, and sets it in the counterweight drive section 53. When the target tension is set, or when the set target tension is changed, the counterweight position is set in the following manner.

If the strip tension is T, a torque Tq required for the counterweight shifting motor 51 is given by $$Tq=2.T.Lr+Wm.Lm-(Ws.St+Wr.Lr+Wf.Lf) \quad (3)$$

where Lr is the distance between the central axis of the movable transportation roll 10 and the supporting shaft 12, Lf is the distance between the center of gravity of the arm 11 and the shaft 12, Lm is the distance between the center of gravity of the counterweight shifting motor 51 (including the sensor and the like) and the shaft 12, Wr is the weight of the roll 10, Ww is the weight of the counterweight 50, Wf is the weight of the arm 11, and Wm is the weight of the counterweight shifting motor 51 (including the sensor).

Figure 2:
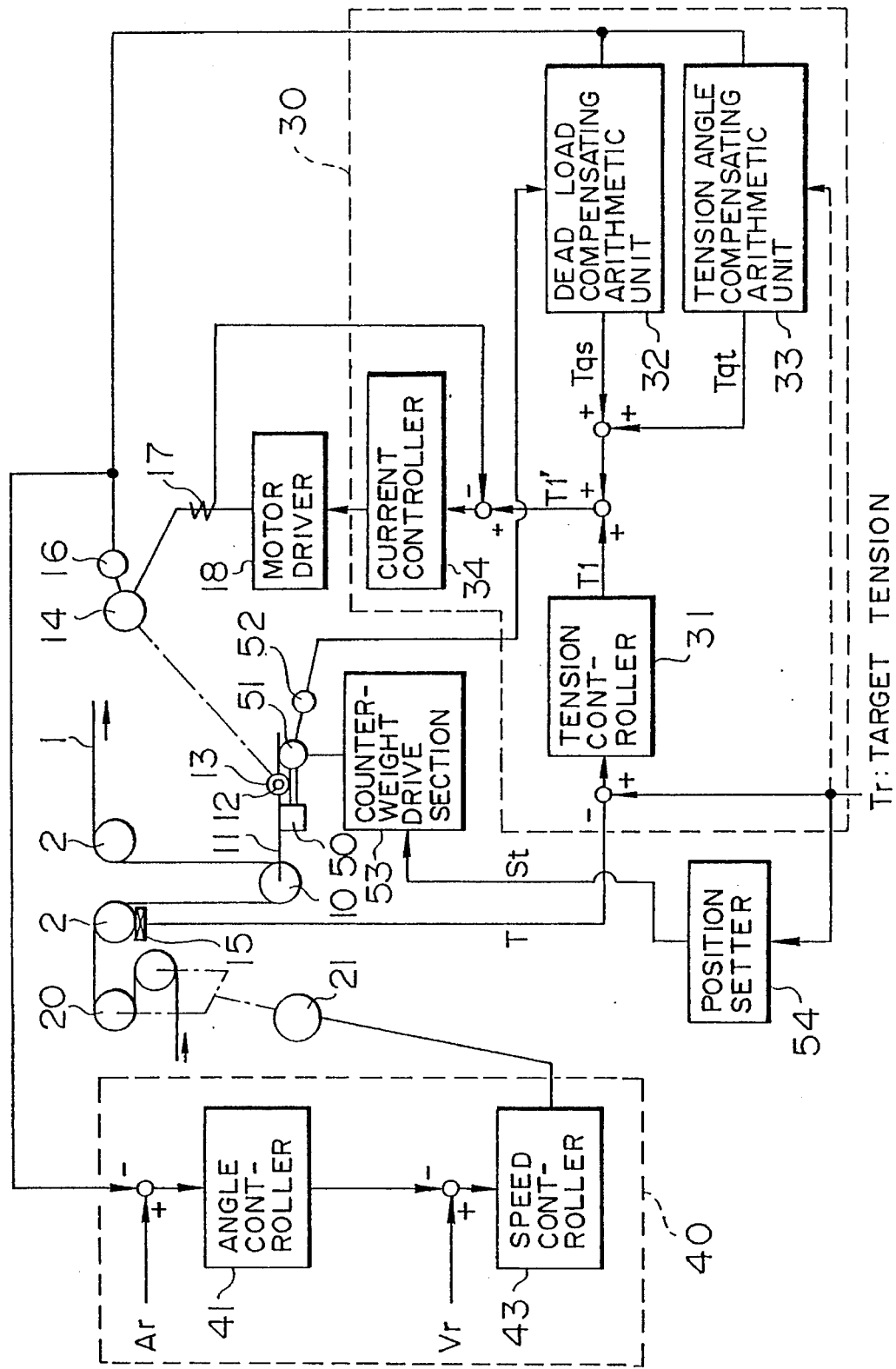
FIG. 2 is a block diagram showing an outline of a second embodiment of the present invention, with parts in a layout diagram.

In the second embodiment, as shown in FIGS. 2 and 3, the counterweight shifting motor 51 is located on the opposite side of the supporting shaft 12 with respect to the movable transportation roll 10, so that a torque Wm. St on the arm 11, which is based on the weight Wm of the motor 51, acts in the same direction as the tension of the strip on the arm 11 as indicated by the first term of equation (3).

If the torque of the arm driving motor 14 and the target tension are Ctq and Tref, respectively, the counterweight position St, based on equation (3), is given by $$St=(2Tref.Lr+Wm.Lm)-(Wr.Lr+Wf.Lf+Ctq)/Ww \quad (4)$$

The movable range (between the maximum and minimum values of the position St) for the counterweight 50 should be established by setting the maximum and minimum values of the necessary target tension Tref for operation at economical values which ensure minimized moment of inertia and required performance in consideration of the torque Ctq of the motor 14 and other constants in equation (4).

After the movable range for the counterweight 50 is established in this manner, the counterweight position St is determined so that the counterweight 50 is situated as close to the supporting shaft 12 of the arm 11 as possible within a range permitted by the torque CTq of the motor 14. Accordingly, the moment of inertia is lowered so that tension control can be effected with high sensitivity.

After the counterweight position St is determined in this manner, the counterweight 50 is moved to the determined position St to obtain the target tension Tref when the time comes for the tension setting or set tension change.

In doing this, the counterweight 50 is moved from its stop position to the position St with a certain speed pattern. Thus, the target value Tref of the strip tension cannot be attained immediately when the time comes for the tension setting or set tension change, so that the tension control is subject to delay.

In order to eliminate this control delay, the position of the counterweight 50 is first detected by means of the sensor 52 and fed back to the tension control section 30 whereby the torque Tq of the motor 14 for the target tension value Tref of equation (3) is dynamically calculated. Then, the calculated torque Tq is entered in the current controller 34 so that the torque Tq is applied to the arm 11 by means of the arm driving motor 14.

Thus, the delay of the tension control of the counterweight 50 is compensated so that the tension of the strip 1 can be controlled for the target tension Tref without a delay in the timing for tension setting or set tension change.

In the second embodiment, the counterweight 50 is arranged for movement on the arm 11 so that it is adjustable in position with respect to a direction perpendicular to the supporting shaft 12. According to this embodiment, however, the counterweight may be arranged on any suitable means other than the arm which is movable at right angles to the supporting shaft.

According to the present invention, as described herein, the tension of the strip can be controlled with high responsiveness and high accuracy despite its drastic variation externally introduced into the central section or the like.

Since the counterweight is provided on the supporting shaft, moreover, the strip tension can be controlled with good responsiveness and satisfactory accuracy by means of the small-capacity motor, despite a fine variation in the strip tension. In setting the strip tension or changing the set tension, furthermore, the tension can be adjusted to the desired target value. Thus, very effective tension control which is beyond the capability of the conventional dancer roll can be enjoyed. An investigation made by the inventor hereof indicated that the apparatus of the present invention can effect high-accuracy tension control such that the variation in the strip tension can be reduced to about ⅓ as compared with the conventional case.

What is claimed is:

1. An apparatus for controlling tension in a continuous metallic strip in a process line in which a trailing end of an initial strip, uncoiled from an initial coil, is connected to a leading end of a subsequent strip, uncoiled from a subsequent coil, to form the continuous strip, which is threaded over bridle and transportation rolls, the apparatus comprising:

a movable transportation roll around which the continuous strip partially extends;

a supporting shaft rotatable supported by bearing means;

an arm mounted pivotable about the supporting shaft and having one end connected to the movable transportation roll;

an arm driving motor coupled to the supporting shaft and generating a torque in the arm about the supporting shaft to apply a tension to the continuous strip;

an arm angle sensor means for detecting the angular position of of the arm about the supporting shaft;

a tension sensor means for detecting tension in the continuous strip; and a tension control means for correcting the torque generated in the arm based on the angular position of the arm and the tension in the continuous strip, and maintaining the continuous strip tension at a target tension.

2. An apparatus according to claim 1, wherein the tension control means includes:

a tension controller for delivering a torque control command based on a comparison of a detected tension and the target tension;

a dead load compensating arithmetic unit for compensating torque for a dead load of the movable transportation roll and the arm based on the angular position detected by the angle sensor means;

a tension angle compensating arithmetic means for compensating a change of the relationship between the ship tension and the output torque of the arm driving motor based on the angular position of the arm; and a current controller means for controlling the arm driving motor based on a compensated torque command obtained as a sum of the torque control command, an output of the dead load compensating arithmetic unit and an output of the tension angle compensating arithmetic means.

3. An apparatus according to claim 1, further comprising:

a motor torque control means for controlling the torque of the arm driving motor;

a counterweight disposed on the arm, the counterweight being adjustable in a direction perpendicular the supporting shaft to generate the torque in the arm about the supporting shaft;

a counterweight position adjusting means for adjusting the position of the counterweight; and a means for controlling the torque generated in the arm based on the angular position of the arm and the tension in the continuous strip.

4. An apparatus according to claim 3, wherein the tension control means includes:

a tension controller for delivering a torque control command based on a comparison of a detected tension and the target tension;

a dead load compensating arithmetic unit for compensating torque for a dead load of the movable transportation roll and the arm based on the angular position detected by the angle sensor means;

a tension angle compensating arithmetic means for compensating a change of the relationship between the strip tension and the output torque of the arm driving motor based on the angular position of the arm; and a current controller means for controlling the arm driving motor based on a compensated torque command obtained as a sum of the torque control command, an output of the dead load compensating arithmetic unit and an output of the tension angle compensating arithmetic means.

* * * * *